(12) United States Patent
Ito et al.

(10) Patent No.: US 11,173,770 B2
(45) Date of Patent: Nov. 16, 2021

(54) REGISTER

(71) Applicant: TOYODA GOSEI CO., LTD., Kiyosu (JP)

(72) Inventors: Kenichi Ito, Kiyosu (JP); Masaki Otake, Kiyosu (JP); Akihiro Yonese, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 212 days.

(21) Appl. No.: 16/380,145

(22) Filed: Apr. 10, 2019

(65) Prior Publication Data

US 2019/0322160 A1  Oct. 24, 2019

(30) Foreign Application Priority Data

Apr. 18, 2018 (JP) .............................. JP2018-080027

(51) Int. Cl.
 *B60H 1/34* (2006.01)
(52) U.S. Cl.
 CPC ... *B60H 1/3421* (2013.01); *B60H 2001/3478* (2013.01)
(58) Field of Classification Search
 CPC ........ B60H 1/34; B60H 1/345; B60H 1/3414; B60H 1/3421; B60H 1/3428;
 (Continued)

(56) References Cited

U.S. PATENT DOCUMENTS 6,582,293 B1   6/2003 Siniarski et al.
9,821,631 B2 * 11/2017 Kim ..................... B60H 1/0065
(Continued)

FOREIGN PATENT DOCUMENTS

JP   H04-116334 A   4/1992
JP   H05-066451 U   9/1993
(Continued)

OTHER PUBLICATIONS

Japanese Office Action dated May 25, 2021, issued in corresponding Japanese Patent Application No. 2018-080027 (and English Machine Translation).
(Continued)

*Primary Examiner* — Vivek K Shirsat
*Assistant Examiner* — Ko-Wei Lin
(74) *Attorney, Agent, or Firm* — Posz Law Group, PLC

(57) ABSTRACT

A register for air conditioning, includes: a tubular body forming a ventilation flue and an outlet of air for air conditioning; a damper plate including an upstream piece and a downstream piece; and an adjustment mechanism including: a rotatable operation part; a dia shaft fixed to the damper plate; and a link connected to the dia shaft and the operation part to transmit the rotation of the operation part to the dia shaft. The damper plate rotates from an open position to an closed position in a direction where the upstream piece rotates to the downstream side and the downstream piece rotates to the upstream side by an operation of the operation part, and a rotation torque generated when a wind of the air acts on the upstream piece is greater than a torque generated in the downstream piece at least in the vicinity of the closed position.

5 Claims, 6 Drawing Sheets

(58) Field of Classification Search
CPC .... B60H 1/3435; B60H 1/3442; B60H 1/242;
B60H 2001/3478
USPC .................................................. 454/152, 155
See application file for complete search history.

(56) References Cited

U.S. PATENT DOCUMENTS

| | | | | |
|---|---|---|---|---|
| 2010/0130115 | A1* | 5/2010 | Miki | B60H 1/34 454/155 |
| 2013/0029577 | A1* | 1/2013 | Kim | B60H 1/3421 454/155 |
| 2014/0357179 | A1* | 12/2014 | Londiche | F24F 13/075 454/322 |
| 2016/0263967 | A1* | 9/2016 | Schaake | F16K 1/2261 |
| 2016/0288625 | A1* | 10/2016 | Uhlenbusch | B60H 1/3407 |
| 2017/0021692 | A1* | 1/2017 | Terai | B60H 1/3421 |
| 2017/0176045 | A1* | 6/2017 | Terai | B60H 1/3421 |
| 2017/0240025 | A1* | 8/2017 | Tian | B60H 1/3421 |
| 2018/0170152 | A1* | 6/2018 | Lee | B60H 1/3421 |
| 2018/0304726 | A1* | 10/2018 | Araujo Nieto | B60H 1/3421 |
| 2019/0118620 | A1* | 4/2019 | Lee | B60H 1/345 |

FOREIGN PATENT DOCUMENTS

| | | |
|---|---|---|
| JP | 2003-65581 A | 3/2003 |
| JP | 2007-152980 A | 6/2007 |
| JP | 2012-180960 A | 9/2012 |
| JP | 2012-254662 A | 12/2012 |

OTHER PUBLICATIONS

Japanese Office Action dated Aug. 10, 2021, issued in corresponding Japanese Patent Application No. 2018-080027 (and English Machine Translation).

* cited by examiner

A-A SECTIONAL VIEW

REGISTER

CROSS-REFERENCE TO RELATED APPLICATION(S)

This application is based upon and claims the benefit of priority from Japanese Patent Application No. 2018-080027, filed on Apr. 18, 2018, the entire contents of which are incorporated herein by reference.

BACKGROUND

1. Field of the Invention

The present invention relates to a register for air conditioning in which air for air conditioning sent from an air conditioner is blown from an outlet of a ventilation flue, and more particularly to a register for air conditioning provided with a damper plate including an upstream piece and a downstream piece for opening and closing the ventilation flue.

2. Description of the Related Art

In JP-A-2007-152980, JP-A-1992-116334, U.S. Pat. No. 6,582,293, and Japanese examined utility model application No. H05-66451 to be described later, a register is disclosed in which a damper plate including an upstream piece and a downstream piece is disposed in a ventilation flue, the ventilation flue is opened and closed by the rotation of the damper plate, and the volume of air for air conditioning to be directed toward an occupant is controlled.

For example, in the register disclosed in JP-A-2007-152980, in order to control the flow rate of a fluid passing through a flow path, a damper member passes through a guide portion between an open position and a closed position, and an angle between the center line of a duct as the ventilation flue and the damper member is changed by a dial as a fingertip operation part to adjust the opening and closing of the ventilation flue. In JP-A-1992-116334, U.S. Pat. No. 6,582,293, and Japanese examined utility model application No. H-05-66451, as described in JP-A-2007-152980, the rotation of the damper plate is controlled by an operation part, through a link mechanism.

In such a register, when the operation part as the working part is turned, since the force in the direction of shutting the damper plate is not sufficiently applied through the link due to the design constraint, the space constraint, and the mechanism restriction, there is a problem that the damper plate cannot be shut even if the operation part is turned, resulting in generation of wind leakage.

SUMMARY

The present invention has been made in consideration of the above-described circumstances, and the inventor of the present application sets an object to provide, a register including a plate-shaped damper plate capable of rotating about a damper shaft provided inside a ventilation flue and extending from the damper shaft to an upstream side and a downstream side respectively, in which wind leakage can be prevented when the damper plate is adjusted to a closed position where the ventilation flue is fully closed.

According to an aspect of the invention, there is provided a register for air conditioning, including: a tubular body forming a ventilation flue and an outlet of air for air conditioning; a damper plate including an upstream piece and a downstream piece capable of rotating between an open position where the ventilation flue is fully opened and a closed position where the ventilation flue is fully closed, at a damper shaft extending across the ventilation flue on an upstream side from the outlet of the ventilation flue, the upstream piece extending to the upstream side from the damper shaft and the downstream piece extending to a downstream side from the damper shaft at the open position; and an adjustment mechanism including: a rotatable operation part disposed to be operable by an occupant; a dia shaft fixed to the damper plate; and a link connected to the dia shaft and the operation part to transmit the rotation of the operation part to the dia shaft, wherein the damper plate rotates from the open position to the closed position in a direction where the upstream piece rotates to the downstream side and the downstream piece rotates to the upstream side by the operation of the operation part, and a rotation torque generated when the wind of the air for air conditioning acts on the upstream piece is greater than a torque generated in the downstream piece at least in the vicinity of the closed position.

Since the rotation torque generated by the wind of the air for air conditioning can be used as the aid for a force to move the damper plate from the open position of the damper plate to the closed position, the damper plate is reliably moved, and thus it is possible to prevent wind leakage.

DETAILED DESCRIPTION OF THE INVENTION

Hereinafter, an embodiment according to the present invention will be described in detail. In the following embodiment, the directions of "front", "rear", "left", "right", "up", and "down" used for description coincide with the directions of "front", "rear". "left", "right", "up", and "down" relative to an occupant when the occupant sits facing the front side of the vehicle.

A register 1 according to a first embodiment of the present invention is illustrated in FIGS. 1 to 5B. In the vehicle compartment, an instrument panel (not illustrated) is provided on the front side of the front seat (driver's seat and passenger's seat) of the vehicle, and a register for air conditioning is incorporated in the center portion thereof, the side portion, and the like in the left and right direction (vehicle width direction). The main function of the register for air conditioning is to change the direction of the air for air conditioning which is sent from an air conditioner to be blown into the vehicle compartment from the outlet, to adjust the blowing amount of the air for air conditioning, and the like. In adjustment of blowing amount, shutting off the blowing is included.

Figure 1:
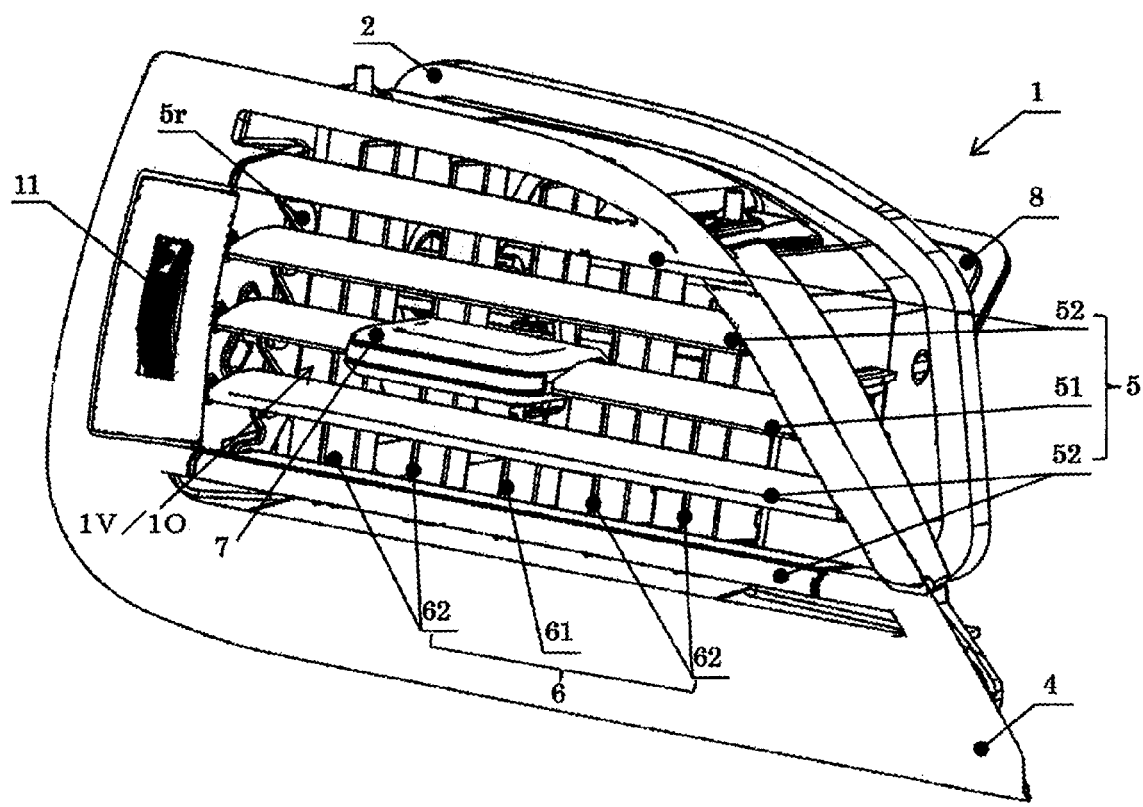
FIG. 1 is a perspective view illustrating the appearance of assembly of a register according to the present invention.
Figure 2:
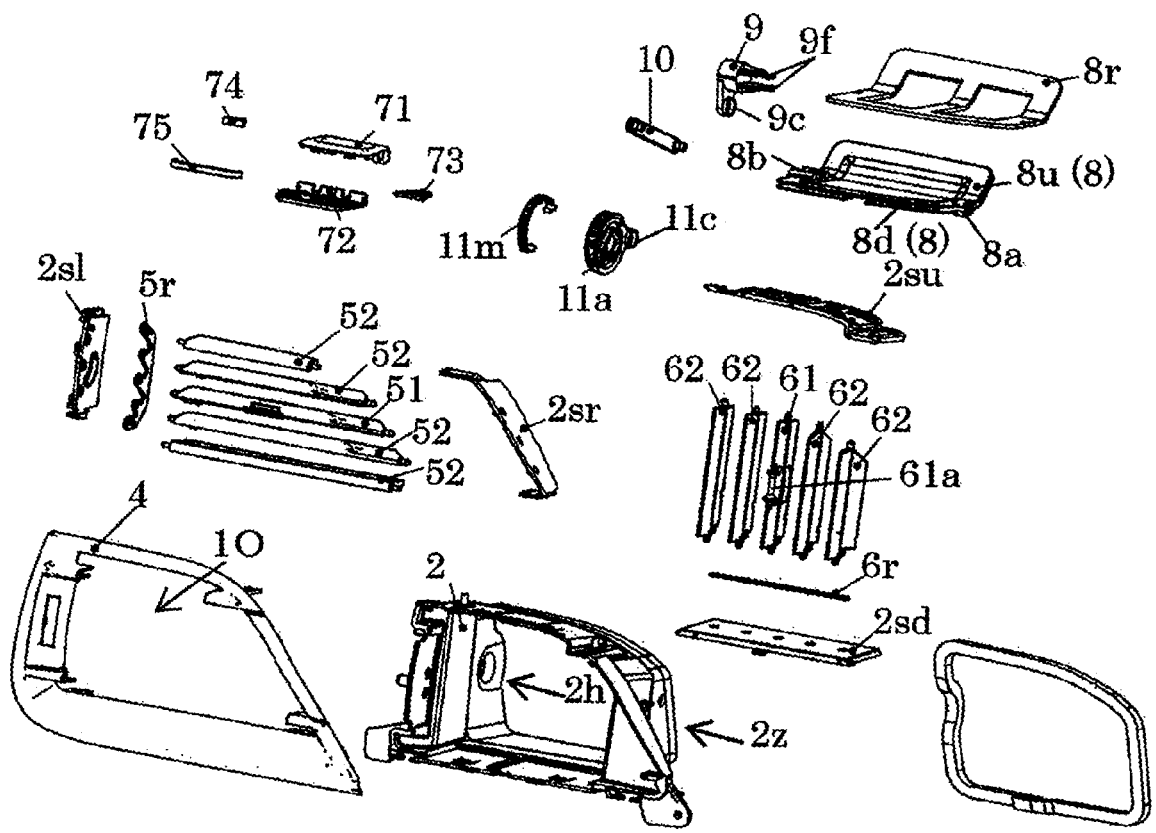
FIG. 2 is an exploded perspective view illustrating the register according to the present invention.

As illustrated in FIGS. 1 and 2, the register 1 for air conditioning includes a tubular body 2, downstream fins 5, upstream fins 6, a damper plate 8, an operation knob 7 between the downstream fins 5 and the upstream fins 6, and an adjustment mechanism 12 of the damper plate 8. Next, the configuration of each part forming the register 1 for air conditioning will be described.

As illustrated in FIGS. 1 to 3B, the tubular body 2 forming a ventilation flue 1V includes a tubular main body part for connecting an air duct 3 of the air conditioner and an opening (not illustrated) provided in the instrument panel, a upper shim 2su and a lower shim 2sd each including a upstream fin bearing 2y which pivotally supports an upstream fin to be described, a right shim 2sr and a left shim 2sl each including a downstream fin bearing 2x which pivotally supports a downstream fin to be described, and a bezel 4 on the downstream side. According to the flowing direction of the air for air conditioning, the tubular body 2 is connected to the air duct 3 on the upstream side to form a curved portion C.

Figure 3A:
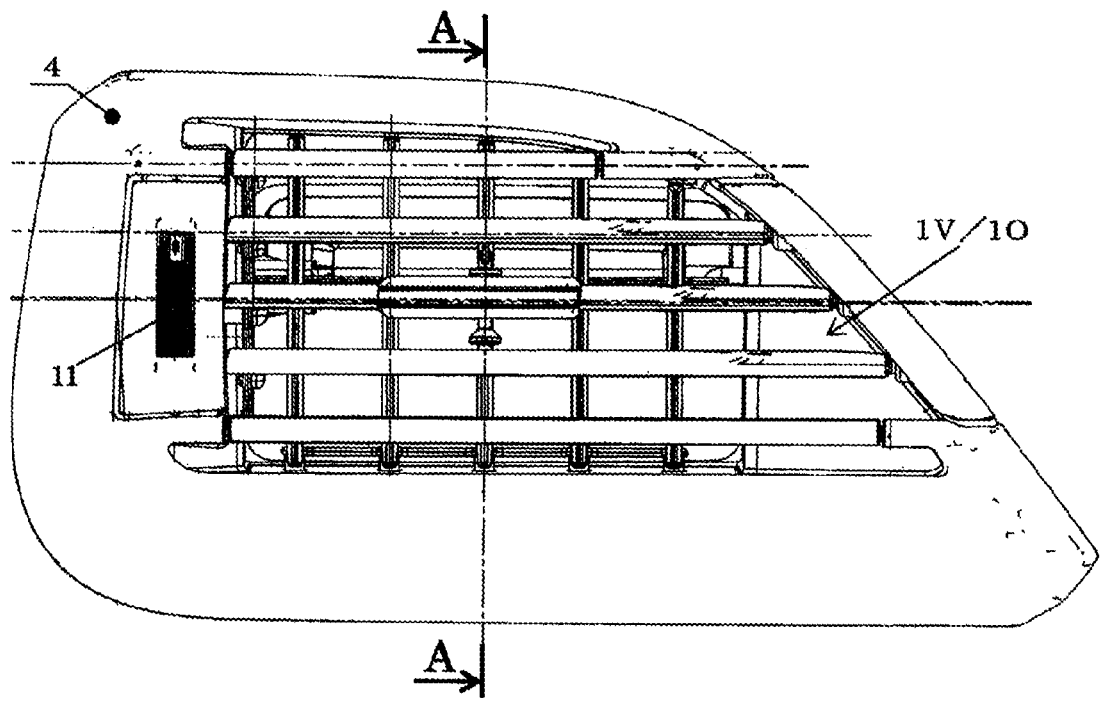
FIG. 3A is a front view of the register of the present invention and FIG. 3B is a sectional view at the position of A-A line of the present invention.
Figure 3B:
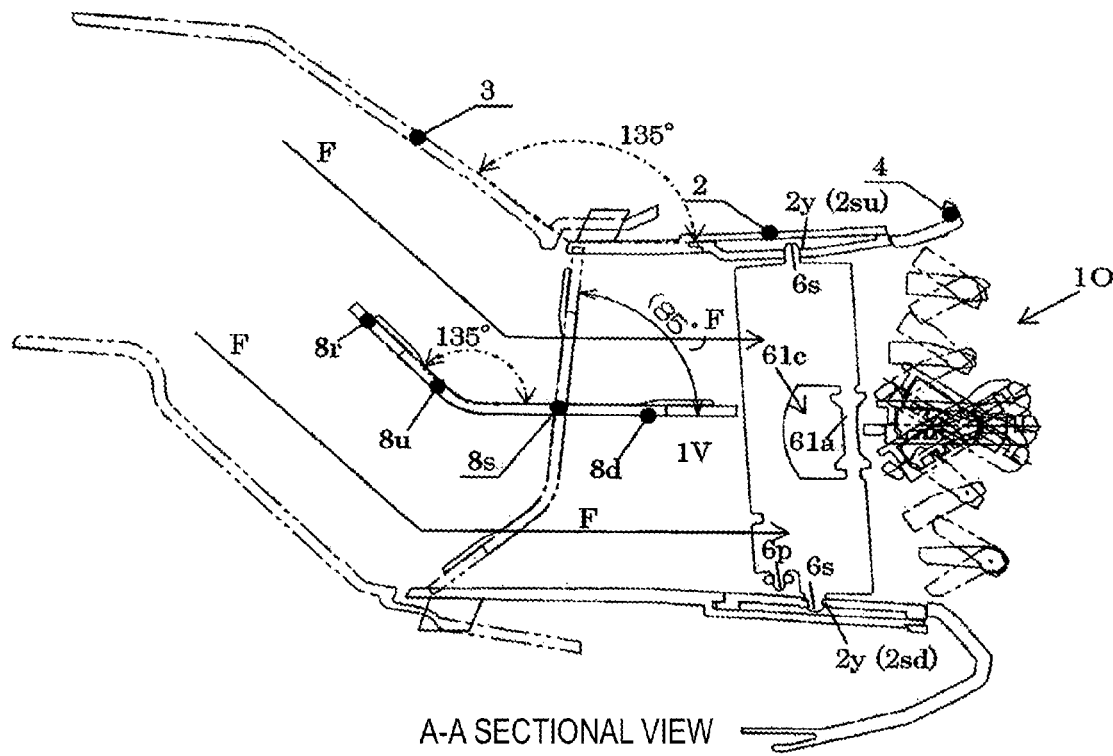
Figure 4A:
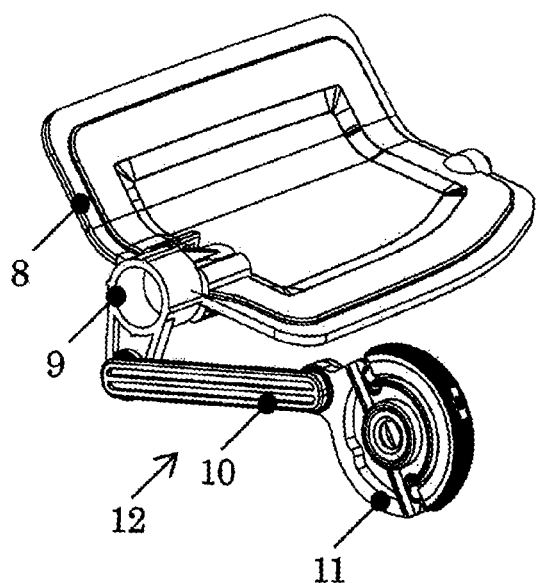
FIG. 4A is a perspective view illustrating an open state of an adjustment mechanism and a damper plate of the register of the present invention.
Figure 4B:
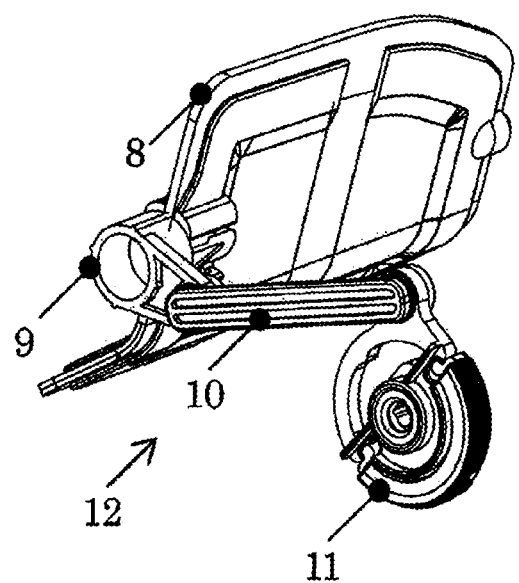
FIG. 4B is a perspective view illustrating a closed state of the adjustment mechanism and the damper plate of the register of the present invention.
Figure 4C:
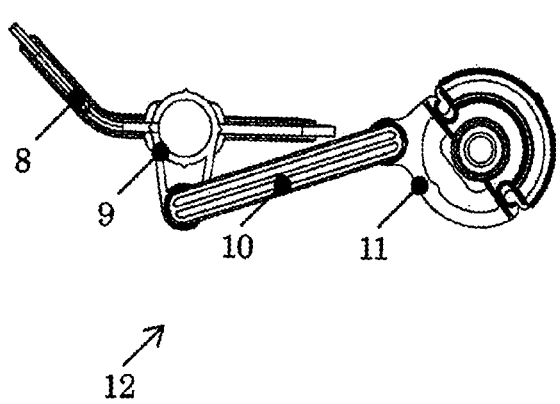
FIG. 4C is a side view illustrating the open state of the adjustment mechanism and the damper plate of the register of the present invention.
Figure 4D:
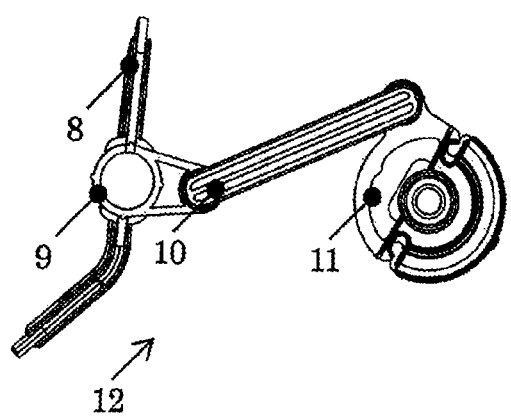
FIG. 4D is a side view illustrating the closed state of the adjustment mechanism and the damper plate of the register of the present invention.

The internal space of the tubular body 2 formed by assembling the tubular main body part and the bezel 4 corresponds to the ventilation flue 1V of the air for air conditioning (refer to FIG. 3B). Incidentally, the "upstream" and "downstream" described in this specification are set based on the flowing direction F (refer to FIG. 3B) of the air for air conditioning.

The bezel 4 is a member constituting the most downstream portion of the tubular body 2. The bezel 4 is locked to the bezel locking projections provided at the corresponding places of the upper wall portion and the lower wall portion of the tubular main body part, at the bezel locking holes provided at a plurality of places in the upper portion and at a plurality of places in the lower portion of the bezel 4 to be connected to the tubular main body part. As illustrated in FIG. 1, in the bezel 4, an outlet 10 through which air for air conditioning is blown is formed at a place serving as a downstream end of the ventilation flue 1V. The surrounding portion of the outlet 10 corresponding to the downstream end surface of the bezel 4 constitutes the design surface of the register 1 for air conditioning. By assembling the tubular main body part which includes the upper shim 2su, the lower shim 2sd, the right shim 2sr, and the left shim 2sl, and the bezel 4, the ventilation flue 1V is formed passing through in the front and rear direction.

The tubular body 2 is fixed to the duct 3 to form an angle of 130° to 140° with the duct 3 on the upstream side.

As illustrated in FIGS. 1 to 3B, a downstream fin group 5 includes a plurality (five) of downstream fins. Each downstream fin is used to change the vertical angle of air blown out from the outlet 10 (see FIGS. 3A and 3B). The plurality of downstream fins are arranged at substantially equal intervals in the vertical direction and spaced apart front each other substantially in parallel.

Here, in order to distinguish the five downstream fins, one downstream tin positioned in the center portion in the vertical arrangement direction is referred to as a "primary downstream fin 51", and the others are referred to as "secondary downstream fins 52". The main part of each downstream fin is formed of a plate-shaped body extending in the left and right direction.

A ridge portion 51r is formed integrally with the primary downstream fin 51 at the substantially center portion in the left and right direction on the upper surface of the primary downstream fin 51. The ridge portion 51r is positioned in the downstream portion on the upper surface of the primary downstream fin 51 along the flowing direction F of the air for air conditioning and has a flat shape having a large dimension in the left and right direction with respect to the vertical dimension. The ridge portion 51r restricts the amount of sliding movement of the operation knob 7 within a predetermined range by contacting the upper side portion of the operation knob 7 described later attached to the primary downstream fin 51.

Downstream fin shafts 5s extending in the same direction are respectively provided on both end surfaces of the downstream fins 51 and 52 in the left and right direction. Each downstream fin shaft 5s is positioned in a downstream portion of both end surfaces of the downstream fin 5 along the flowing direction F of the air for air conditioning. The downstream fin shaft 5s for each of the downstream fins 51 and 52 is supported by a downstream bearing portion 2x of the tubular body.

The downstream end edge of the downstream fin 5 extends linearly in the left and right direction along the downstream fin shaft 5s. As illustrated in FIGS. 1 and 2, downstream fin connecting pins 5p extending in parallel to one shaft 5s are provided at places deviated to the upstream side from the one shaft 5s in the downstream fins 51 and 52. These downstream fin connecting pins 5p are connected via an engaging hole with a downstream connecting rod 5r extending in the vertical direction. The downstream fins 51 and 52 are mechanically connected by the downstream connecting rod 5r with the downstream fin connecting pins 5p and the corresponding engaging holes, so that a downstream link mechanism is configured which tilts the downstream fin group 5 to have the same inclination.

As illustrated in FIGS. 1 to 3B, the upstream fin group 6 includes a plurality of (five) upstream fins arranged in the ventilation flue IV on the upstream side from the downstream fin group 5. Each upstream fin is used to change the angle of the air blown out from the outlet 10 in the left and right direction. Each upstream fin is formed of a plate-shaped body extending in the vertical direction and in the flowing direction F of the air for air conditioning in the ventilation flue 1V. The plurality of upstream fins are arranged at substantially equal intervals in the left and right direction and spaced apart from each other substantially in parallel.

Here, in order to distinguish the plurality of upstream fins, one upstream fin positioned in the center in the left and right direction is referred to as a "center upstream fin 61", and the others are referred to as "end upstream fins 62".

Upstream fin shafts 6s extending in the same direction are provided on both end surfaces of the upstream fins 61 and 62 in the vertical direction, Each upstream fin shaft 6s is positioned substantially at the center of the vertical end surface of each of the upstream fins in the flowing direction F of the air for air conditioning. The upstream fin shafts Cs at both ends of each upstream fin are tiltably supported with respect to the upper wall portion and the bottom wall portion by the upstream bearing 2y formed in the tubular body (see FIG. 3B).

In the center upstream fin 61, a rectangular cutout portion 61c at the substantially middle portion in the vertical direction on the downstream side along the flowing direction F of the air for air conditioning, and a transmission shaft 61a parallel to the upstream fin shaft 6s in the rectangular cutout portion 61c is integrally formed with the center upstream fin 61. This is for the center upstream fin 61 to be tilted by the transmission shaft 61a being interposed between a pair of coupling pieces 73f of a fork 73 of the operation knob 7 to be described later at a position where the shaft line of the transmission shaft 61a, is deviated from the shaft line of the upstream tin shaft 6s of the center upstream fin 61 in accordance with sliding of the operation knob 7.

The downstream end edges of the upstream fins 61 and 62 linearly extend in the vertical direction along the upstream fin shaft 6s. As illustrated in FIG. 3B, an upstream fin connecting pin 6p extending in parallel to one shaft 6s is provided at a place deviated to the upstream side from the one shaft Cs in each of the upstream fins 61 and 62. These upstream fin connecting pins 6p are connected to each other via an engaging hole with an upstream connecting rod 6r extending in the left and right direction. An upstream link mechanism is configured which tilts all the upstream fins 61 and 62 to have the same inclination in the synchronized state using the upstream fin connecting pins 6p and the upstream connecting rod 6r with respect to the upstream fin shaft supported by the upstream bearing portion 2y.

As illustrated in FIGS. 1 to 3B, the operation knob 7 according to the present embodiment is a member which is operated when the airflow from the register 1 is adjusted in the vertical direction and the left and right direction, and assembled to be slidably movable in the left and right direction along the primary downstream fin 51 by being positioned in the center of the outlet 10 on the front surface of the register 1. The amount of sliding movement of the operation knob 7 is restricted by the contact between the ridge portion 51r of the primary downstream fin 51 and the side surface of the operation knob.

As illustrated in FIGS. 1 to 3B, the operation knob 7 includes a main body portion formed of an upper member 71 and a lower member 72, the fork 73 projecting from the upstream end of the main body portion in the upstream direction, a rubber shim 74 installed at the downstream end of the main body portion, and a protective molding 75. The upper member 71 and the lower member 72 are assembled from the upper and lower sides of the primary downstream fin 51 with the rotation shaft at the downstream end of the fork 73 interposed therebetween so that the pair of coupling pieces of the fork 73 project to the upstream side while interposing the transmission shaft 61a of the center upstream fin therebetween to make the primary downstream fin 51 swingable in the vertical direction, whereby the sliding along the primary downstream fin 51 can be transmitted to the center upstream fin 61.

As illustrated in FIGS. 1 to 4D, the damper plate 8 is provided on the upstream side from the upstream fin group 6 in the tubular body 2 and at a position where the damper plate does not interfere with the upstream tin group 6 on the downstream side when rotating, and is for opening and closing the ventilation flue 1V. The damper plate 8 includes a damper shaft 8s which is limited between a protrusion shaft 8a pivotally supported by a hearing 2z on the side wall of the tubular body and a fitting portion 8b combined to a fork portion 9f of a dia shaft 9 described later projecting through an insertion hole 2h on the opposite side to the bearing 2z, an upstream piece 8u extending to the upstream side from the damper shall 8s when the damper plate 8 is in the open position where the tubular body 2 is fully opened, and a downstream piece 8d extending to the downstream side from the damper shaft 8s in the same state. In the present embodiment, the upstream piece 8u of the damper plate 8 is bent in a direction opposite to the direction of rotation from the substantially central position in the direction orthogonal to the damper shaft 8s to the closed position along the surface to form an angle of 120° to 150° (in the present embodiment, 135°) with the other portions. By adjusting the position of the rotation shaft of the damper plate 8, the area of the upstream piece 8u is increased by about 40% compared to the area of the downstream piece 8d.

The damper plate 8 is supported to be rotatable about the damper shaft 8s between the protrusion shaft 8a and the fitting portion 8b such that the protrusion shaft 8a at one end protrudes into the bearing 2z and the fitting portion 8b at the other end is coupled to the fork portion 9f of a dia shaft 9 protruding through the insertion hole 2h on the opposite side to the bearing 2z.

A damper seal 8r made of rubber or urethane is arranged around the damper plate 8 in order to improve the sealing performance when the damper plate 8 is in the closed position substantially orthogonal to the flowing direction of the air for air conditioning.

One end of the dia shaft 9 is provided with the rotatable fitting portion 8b which is inserted into the insertion hole 2h on the left side surface of the tubular body 2 and is at one end of the damper plate 8 rotatably disposed inside the tubular body 2 via the insertion hole 2h, and a fork 9f which is fixed in a non-rotatable manner, and the other end thereof is provided with a connecting hole 9c for rotatably connecting to a connecting shaft 10su at one end of a link described later.

As illustrated in FIG. 2 and FIGS. 4A to 4D, the link 10 is for transmitting the rotation of the operation part 11 described later to the dia shaft 9. The link 10 includes the connecting shafts 10su and 10sd respectively at both ends for rotatably connecting to the connecting hole 9c of the dia shaft 9 and a connecting hole 11c of the operation part 11 described later.

As illustrated in FIGS. 1 to 4D, the operation part 11 when rotating the damper plate 8 disposed inside the tubular body 2 includes a main body 11a, a shaft hole 11b pivotally supported to an operation part supporting shaft 2p formed near the rear edge on the left side surface of the tubular body 2, and the connecting hole 11c to which the connecting shaft 10sd at the downstream end of the link 10 is attached.

In order to improve the operability, a decorative molding 11m for covering the portion exposed from the corresponding opening of the bezel 4 is attached to the operation part 11. On the surface of the decorative molding 11m, an uneven shape for improving the operational feeling and a mark indicating the operation angle and the limit are provided. From the ergonomic knowledge, it is desirable to have a structure in which the opening and closing motion of the damper plate is completed by rotating the operation part by 40° to 50° (in the present embodiment, 45°).

As described above, it is possible to form the adjustment mechanism 12 including the operation part 11, the link 10, and the dia shaft 9 and capable of controlling the rotation of the damper plate 8.

As illustrated in FIGS. 4A to 5B, in the adjustment mechanism 12, when opening the tubular body, the angle between the link 10 and the dia shaft 9 is reduced so that the rotation of the operation part 11 is sufficiently transmitted to the damper plate 8 until the damper plate 8 reaches the open position. At the open position, the dia shaft 9 is set to be orthogonal to the flowing direction F of the air for air conditioning along the ventilation flue TV As a result, the projection of the dia shaft 9 toward the duct 3 side is minimized, and the space occupied by the tubular body 2 is reduced. When the damper plate is at the closed position, the angle between the link 10 and the dia shaft 9 is 145° to 155°.

For preventing unintended movement, friction is imparted using a shim or the like on the adjustment mechanism 12. Accordingly, a driving force is required to rotate the damper plate 8. In the present application, as a rotational force applied by the fingertip and the aid of rotational force, a difference in wind pressure applied to the upstream piece and the downstream piece of the damper plate 8 becomes the driving force at the time of rotating of the damper plate 8.

As described above, in the damper plate 8, the protrusion shaft 8a at one end is inserted into the bearing 2z near the upstream end of the tubular body 2 so that the bent upstream piece 8u is on the upstream side, and the fitting portion 8h at the other end and the fork portion 9f of the dia shaft 9 which protrudes through the insertion hole 2h on the opposite side are combined non-rotatable, so that assembling of the damper plate is completed which rotates about the damper shaft 8s between the protrusion shaft 8a and the fitting portion 8b by rotating the dia shaft 9 outside of the tubular body 2.

An air passage substantially parallel (a deviation within ±10° is permitted) to the duct 3 on the upstream side of the tubular body 2 and the shape of the damper plate 8 at the open position is formed. In the present embodiment, an angle of approximately 135° is formed and fixed therebetween.

In the adjustment mechanism 12, the dia shaft 9, the link 10, and the operation part 11 are assembled such that, when opening the tubular body 2, the angle between the link 10 and the dia shaft 9 is reduced to sufficiently transmit the rotation of the operation part to the damper plate until the damper plate is moved to the open position, and when closing the tubular body, the angle between the link 10 and the dia shaft 9 is increased to form an angle of 145° to 155° between the link 10 and the dia shaft 9 when the damper plate is in the closed position, whereby the assembly of the adjustment mechanism 12 is completed.

By arranging the center upstream fin 61 in the middle and connecting the upstream fins 61 and 62 with the upstream connecting rod 6r through the combination of the upstream engaging hole and the upstream fin connecting pin 6p, the upstream fin group 6 is formed, the upstream fin shafts 6s at both ends and the bearings 2y of the upper and lower shims 2su and 2sd are rotatable combined and assembled inside the tubular body.

The operation knob 7 is formed such that the upper member 71 and the lower member 72 are respectively assembled from lower sides of the primary downstream fin 51 with the rotation shaft at the downstream end of the fork 73 interposed therebetween so that the rubber shim 74 and the protective molding 75 can be installed at the downstream end, and the secondary downstream fins 52 are arranged on the upper and lower sides thereof. In addition, the downstream fins 51 and 52 are connected with the downstream connecting rod 5r through the combination of the downstream engaging hole and the downstream fin connecting pin 5p, thereby forming the downstream fin group 5.

The downstream fin shafts 5s at both ends of the downstream fins 51 and 52 and the bearings 2x of the left shim 2sl and the right shim 2sr are coupled to be rotatable and assembled inside of the tubular body such that the pair of coupling pieces of the fork 73 project to the upstream side to interpose the transmission shaft 61a of the center upstream fin 61.

The operation part 11 is attached to be able to rotate about the operation part supporting shaft 2p and the bezel 4 is locked to the bezel locking projections provided at places on the downstream side of the tubular body 2 which correspond to the bezel locking holes, so that the bezel 4 is assembled to the tubular body 2 and the assembling of the register 1 is completed.

The operation part 11 in which a part of the outer circumferential surface is exposed is rotated by 40° to 50° (45° in the present embodiment) to rotate the damper plate 8 by 75° to 90° (85° in the present embodiment) and to move the damper plate 8 between the open position and the closed position according to the flowing direction of the wind. Therefore, the operation feeling can be improved.

Figure 5A:
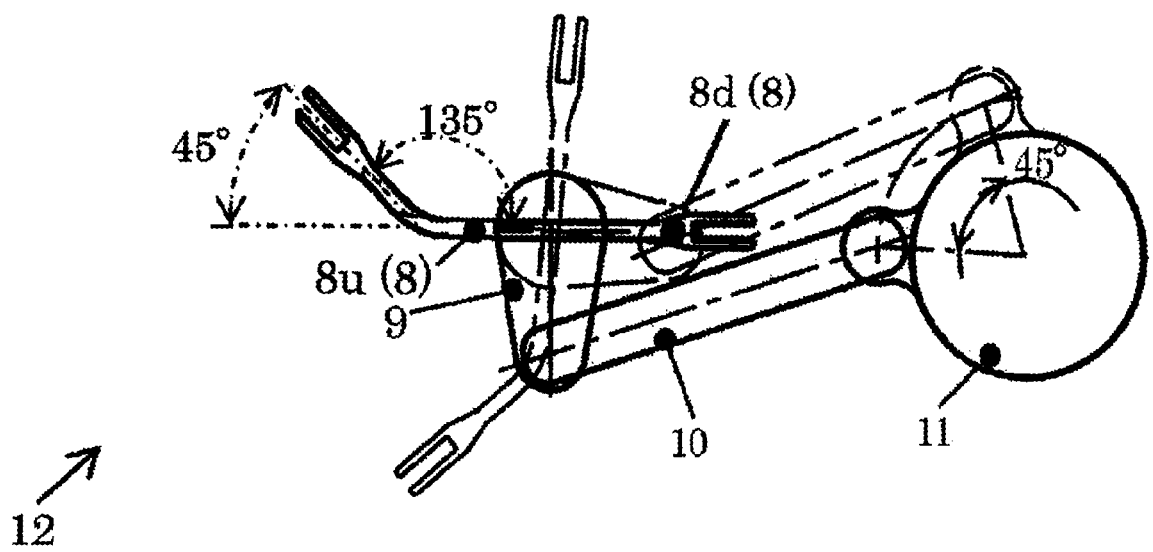
FIG. 5A is a side view illustrating the adjustment mechanism of the register of the present invention and FIG. 5B is a side view illustrating an adjustment mechanism of a register before improvement (corresponding to a comparative example of the present invention)
Figure 5B:
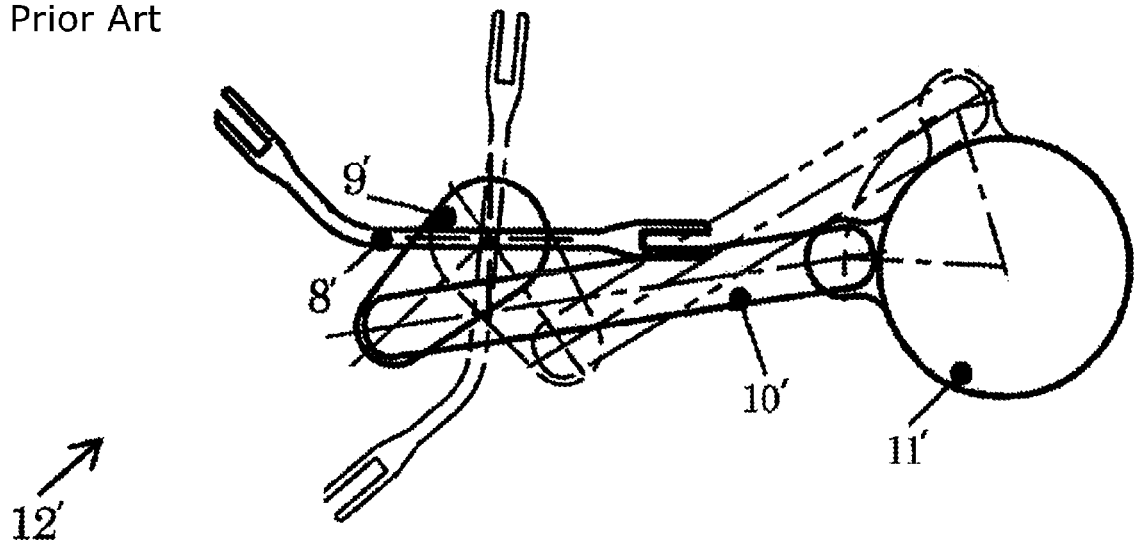

On the premise that the operation part 11 is rotated by 40° to 50° to rotate the damper plate 8 by 75° to 90°, when the damper plate 8 is moved to the open position, in order to avoid the interference with the duct 3 on the upstream side as in the comparative example illustrated in FIG. 5B, the dia shaft 9 is set at a position orthogonal to the flowing direction F of the air for air conditioning along the ventilation flue 1V. When the damper plate 8 is closed, the angle between the dia shaft 9 and the link 10 is set to 145° to 155°. Therefore, the space of the tubular body 2 can be saved, and the driving force of the operation part 11 can be reliably converted into the rotational force of the dia shaft 9.

In the present embodiment, the bending angle of the upstream piece 8u of the damper plate 8 is set to 135°, and the ratio of the area of the upstream piece 8u and the area of the downstream piece 8d is set to 1.4:1.0. When the bending angle is set to be small, the resulting rotation torque increases. However, since it causes pressure loss and noise at the open position, it is desirable to make the bending angle almost equal to the connection angle between the tubular body and the duct.

If the bending angle is reduced or the area ratio is increased, a large rotation torque can be similarly obtained, but a large dial operating force is required at the opening operation. Therefore, it is desirable that a rotation torque larger than the frictional force is generated for the first time when the wind volume is 40% or more at the maximum.

Figure 6:
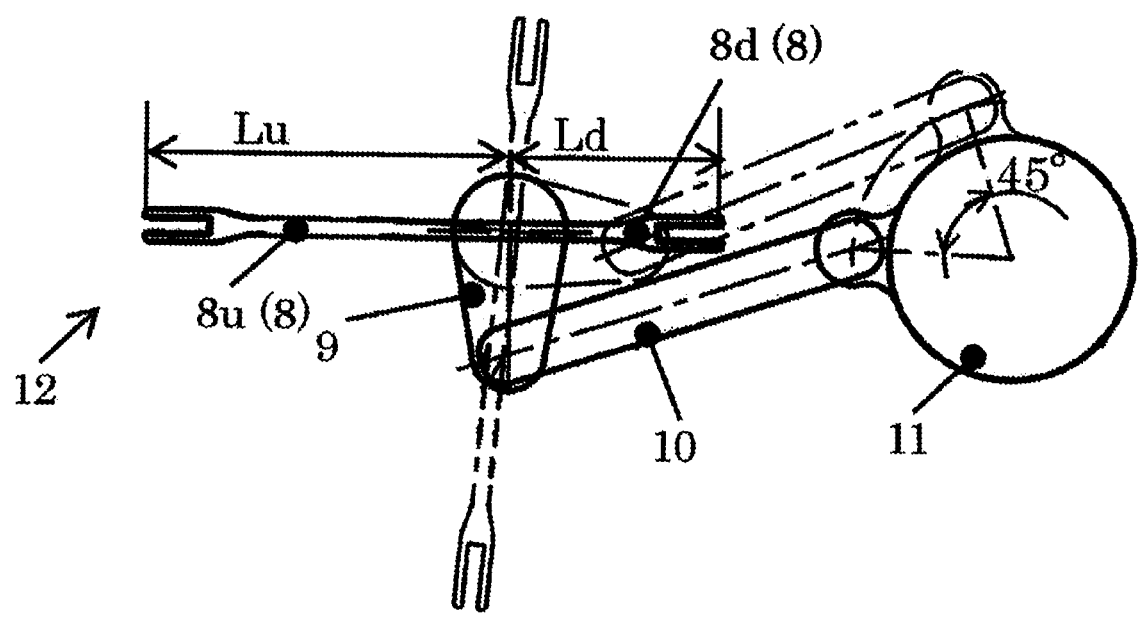
FIG. 6 is a side view illustrating a modification of the adjustment mechanism of the register according to the present invention.

In order to achieve that the upstream piece 8u bears a larger wind pressure than the downstream piece 8d just before the damper plate 8 reaches the closed position, in the damper plate 8, the upstream piece 8u has a larger area than the downstream piece 8d (for example, in FIG. 6, a structure is illustrated in which the ratio of a length Lu of the upstream piece 8u to a length Ld of the downstream piece 8d is 2.0:1.0 with the same width), so that more wind hits the upstream piece 8u compared to the downstream piece 8d and the upstream piece 8u bears a large wind pressure. Therefore, the difference in wind pressure also moves the damper plate 8 to the closed position as the aid of the driving force to overcome the resistance during the movement.

What is claimed is:

1. A register for air conditioning, comprising:
a tubular body forming a ventilation flue and an outlet of air for air conditioning;
a damper plate including an upstream piece and a downstream piece capable of rotating between an open position where the ventilation flue is fully opened and a closed position where the ventilation flue is fully closed, wherein the damper plate rotates about a damper shaft extending across the ventilation flue upstream of the outlet of the ventilation flue, and the upstream piece extends in an upstream direction from the damper shaft and the downstream piece extends in a downstream direction from the damper shaft at the open position; and an adjustment mechanism including: a rotatable operation part disposed to be operable by an occupant; a dia shaft fixed to the damper plate; and a link connected to the dia shaft and the operation part to transmit the rotation of the operation part to the dia shaft, wherein the damper plate rotates from the open position to the closed position in a direction where the upstream piece rotates in the downstream direction and the downstream piece rotates in the upstream direction by the operation of the operation part, and a rotation torque generated when the wind of the air for air conditioning acts on the upstream piece is greater than a torque generated in the downstream piece at least when the damper plate is in the vicinity of the closed position, the downstream piece of the damper plate has a flat plate shape, and when the damper plate is in the closed position, the upstream piece is bent toward the upstream direction at a location that is spaced apart from the damper shaft to form a bending angle with respect to the flat plate shape, and wherein a curved portion of the upstream piece is located between two straight end portions of the upstream piece.

2. The register for air conditioning according to claim 1, wherein the bending angle of the upstream piece is 120° to 150°, and the bending angle is substantially equal to a connection angle of a duct to be connected to the register for air conditioning.

3. The register for air conditioning according to claim 1, wherein in the damper plate, the area of the upstream piece is larger than that of the downstream piece.

4. The register for air conditioning according to claim 1, wherein the operation part is an operation part in which a part of an outer circumferential surface is exposed, when the operation part is rotated by 40° to 50°, the damper plate is rotated by 75° to 90° to move from the open position to the closed position, and an angle formed between the dia shaft and the link is 145° to 155° at the closed position.

5. The register for air conditioning according to claim 1, wherein a soft damper seal is disposed on an outer circumference of the damper plate.

* * * * *